(12) United States Patent
Weissman et al.

(10) Patent No.: US 7,206,134 B2
(45) Date of Patent: Apr. 17, 2007

(54) COMPACT ELECTRONIC VIEWFINDER

(75) Inventors: Paul Weissman, Brewster, NY (US); Mark A. Handschy, Boulder, CO (US)

(73) Assignee: Displaytech, Inc., Longmont, CO (US)

( * ) Notice: Subject to any disclaimer, the term of this patent is extended or adjusted under 35 U.S.C. 154(b) by 0 days.

(21) Appl. No.: 11/051,966

(22) Filed: Feb. 3, 2005

(65) Prior Publication Data
US 2005/0286135 A1 Dec. 29, 2005

Related U.S. Application Data

(60) Provisional application No. 60/542,074, filed on Feb. 4, 2004.

(51) Int. Cl.
 G02B 27/14 (2006.01)
 G09G 5/00 (2006.01)
(52) U.S. Cl. ............................ 359/630; 359/638; 345/8
(58) Field of Classification Search ........ 359/629–630, 359/636–640; 348/337, 341; 396/374, 384; 345/7–9
See application file for complete search history.

(56) References Cited

U.S. PATENT DOCUMENTS

| | | | |
|---|---|---|---|
| 5,625,372 A | 4/1997 | Hildebrand et al. | 345/8 |
| 5,644,323 A | 7/1997 | Hildebrand et al. | 345/8 |
| 5,684,497 A | 11/1997 | Hildebrand et al. | 345/8 |
| 5,771,124 A | 6/1998 | Kintz et al. | 359/633 |
| 5,838,498 A | 11/1998 | Hildebrand et al. | 359/630 |
| 5,870,068 A | 2/1999 | Hildebrand et al. | 345/8 |
| 5,892,624 A | 4/1999 | Kintz et al. | 359/637 |
| 5,905,478 A | 5/1999 | Hildebrand et al. | 345/8 |
| 5,959,781 A * | 9/1999 | Kintz et al. | 359/637 |
| 5,991,084 A * | 11/1999 | Hildebrand et al. | 359/629 |
| 6,134,051 A | 10/2000 | Hayakawa et al. | 359/630 |
| 6,246,527 B1 | 6/2001 | Hayakawa et al. | 359/630 |
| 6,282,029 B1 * | 8/2001 | Ma et al. | 359/629 |
| 6,313,950 B1 | 11/2001 | Hayakawa et al. | 359/630 |
| 6,396,639 B1 | 5/2002 | Togino et al. | 359/630 |
| 6,542,307 B2 | 4/2003 | Gleckman et al. | 359/638 |
| 6,563,648 B2 | 5/2003 | Gleckman et al. | 359/630 |
| 6,594,085 B2 | 7/2003 | Ohtaka et al. | 359/631 |
| 6,603,443 B1 | 8/2003 | Hildebrand et al. | 345/8 |
| 2003/0030912 A1* | 2/2003 | Gleckman et al. | 359/638 |

* cited by examiner

*Primary Examiner*—Alicia M Harrington
(74) *Attorney, Agent, or Firm*—Robert G Crouch; Marsh Fischmann + Breyfogle, LLP (57) ABSTRACT

An electronic viewfinder with a reflective microdisplay and associated optical elements in a design that utilizes one or more folded optical paths to achieve a compact size and volume that may have a dimension of less than 10 millimeters per side. Moreover, the optical design may have an effective focal length that is greater than the spacing of the optical elements from the microdisplay. Various embodiments include a pancake window arrangement with reflective surfaces that are spaced apart from each other and cube beamsplitter eyepieces with folded paths.

17 Claims, 12 Drawing Sheets

Figure 1.

Figure 2. Magnifier doublet (Figure 7.1 from Smith).

PRIOR ART

ORTHOSCOPIC MIL-HDBK-141

| radius | thickness | mat'l | index | V-no | sa |
|---|---|---|---|---|---|
| | 82.560 | air | | | 10.0 |
| | 23.280 | BAK1 | 1.572 | 57.5 | 40.0 |
| -90.950 | 1.100 | air | | | 46.0 |
| 129.490 | 39.680 | KF3 | 1.515 | 54.7 | 46.0 |
| -63.690 | 4.050 | F3 | 1.613 | 37.0 | 43.0 |
| 63.690 | 39.680 | KF3 | 1.515 | 54.7 | 43.0 |
| -129.490 | 49.185 | air | | | 43.0 |

EFL = 100.1
BFL = 49.19
NA = -0.1001 (F/5.0)
GIH = 36.44 (HFOV=20.00)
PTZ/F = -1.257
VL = 190.35
OD infinite conjugate Figure 3. Orthoscopic eyepiece (Figure 7.8 from Smith).

Figure 4. Plössl eyepiece (Figure 7.10 from Smith).

Figure 5. Second Plössl eyepiece (Figure 7.11 from Smith).

Figure 6.

Figure 6. Beam splitter cube illuminator.

COMPACT ELECTRONIC VIEWFINDER

CROSS-REFERENCE TO RELATED APPLICATION

This application claims priority from U.S. Provisional Patent Application No. 60/542,074 filed Feb. 4, 2004, entitled "Compact Electronic Viewfinder", the contents of which are incorporated herein by reference.

The present invention relates generally to optical systems such as electronic viewfinders, and more particularly to compact designs for optical systems for electronic viewfinders.

BACKGROUND OF THE INVENTION

Most still cameras and video cameras today have viewfinders to allow the user to view a representation of the image to be recorded. While these were originally purely optical in nature, they have increasingly become electronic viewfinders such as are typically provided with modern video cameras. Many digital still cameras also have electronic viewfinders, as do wireless Internet appliances, and head-mounted displays. As is often the case in the consumer electronics industry, there is constant pressure to shrink the size of the device and thus the components in the device. For this and other reasons, there is a need to shrink the size of electronic viewfinders.

One representative electronic viewfinder on the market is produced and sold by Displaytech, Inc. of Longmont, Colo. as part of its LIGHTVIEW line of products. While these products may generally fit in a form factor in the range of a cube approximately 20 mm on each side, it may be desirable for similar functionality and quality to be provided in a product fitting in a form factor in the range of a cube approximately 10 mm on each side. As will be seen, new optical designs may be needed to achieve this reduction in volume by a factor of approximately eight.

As can be seen in U.S. Pat. No. 5,808,800, the contents of which are incorporated herein by reference, this current type of electronic viewfinder may include a spatial light modulator that is a pixelated, reflective microdisplay utilizing ferroelectric liquid crystal (FLC) technology. A beam splitter is located above the microdisplay with a lens system on an opposite side from the microdisplay and a light source located to the side of the beam splitter or the microdisplay directing polarized light toward the beam splitter. The polarized light is reflected toward the microdisplay and those pixels that are turned on will change the polarization of the light reflected thereby. Thus, the light from those pixels will pass through the beam splitter and the lens system for viewing by the eye of the user.

Figure 1:
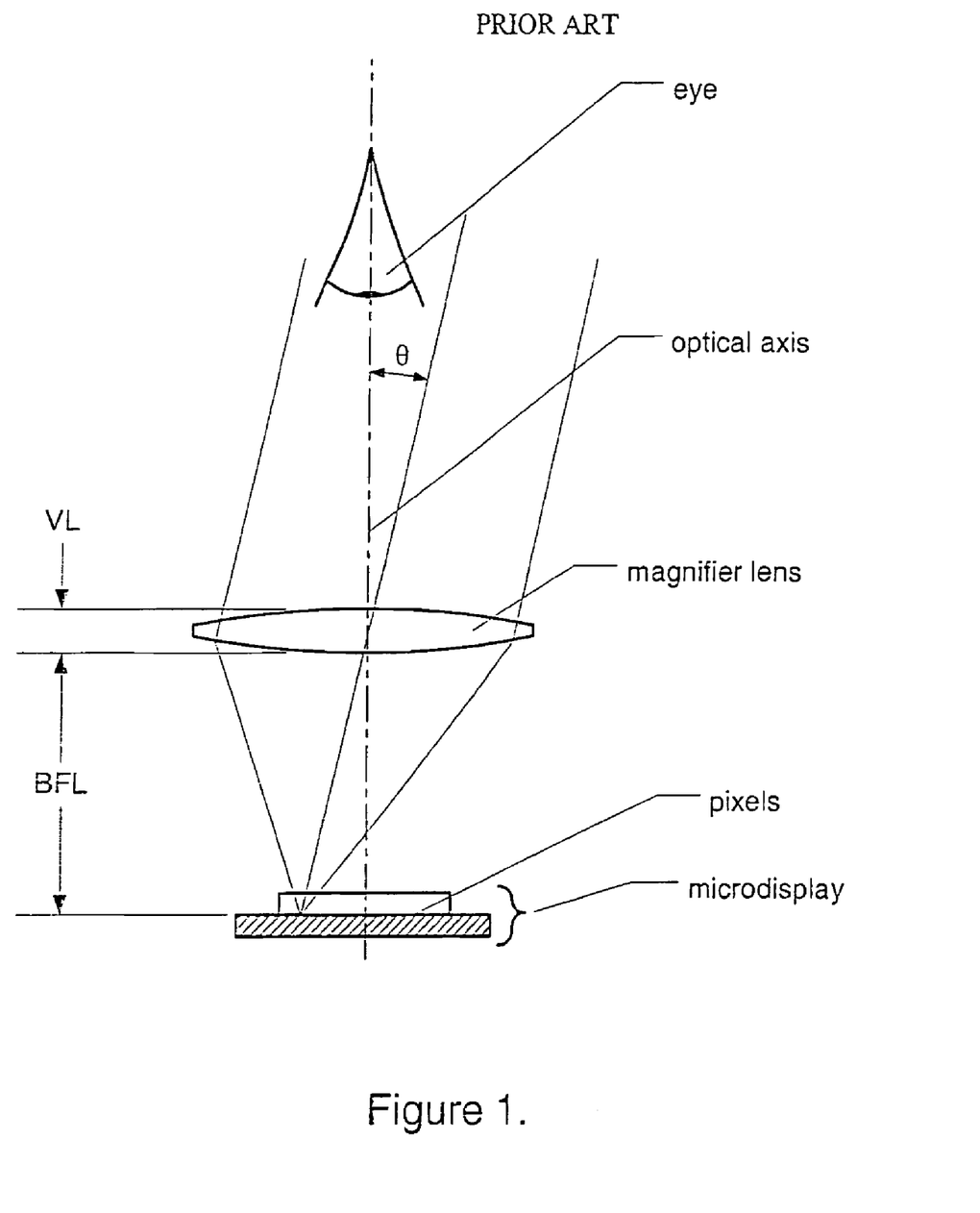
FIG. 1 is a schematic view of a prior art electronic viewfinder.

FIG. 1 shows certain features of the construction of an electronic viewfinder (EVF) of a type suitable for camcorders and digital still cameras. It comprises a small electronic display (a microdisplay) and a magnifying optic, shown here as a simple thin positive lens. The magnifying optic, even if more complex than shown here, may be characterized by its effective focal length (EFL). When the pixel plane of the display is placed between the lens and the focal point of the lens, the lens produces a magnified virtual image of the display. The magnifying power of the optic is conventionally described as 250 mm/EFL. Thus, for example, a lens with a 25 mm EFL is said to be a 10× magnifier. The distance from the backmost surface of the optic along the optic axis to the pixel plane is called the back focal length (BFL), and the thickness of the optic from its backmost surface to its frontmost surface along the optic axis is called its vertex length (VL). We define as the height (H) of an electronic viewfinder the back focal length plus the vertex length (H=BFL+VL).

Figure 2:
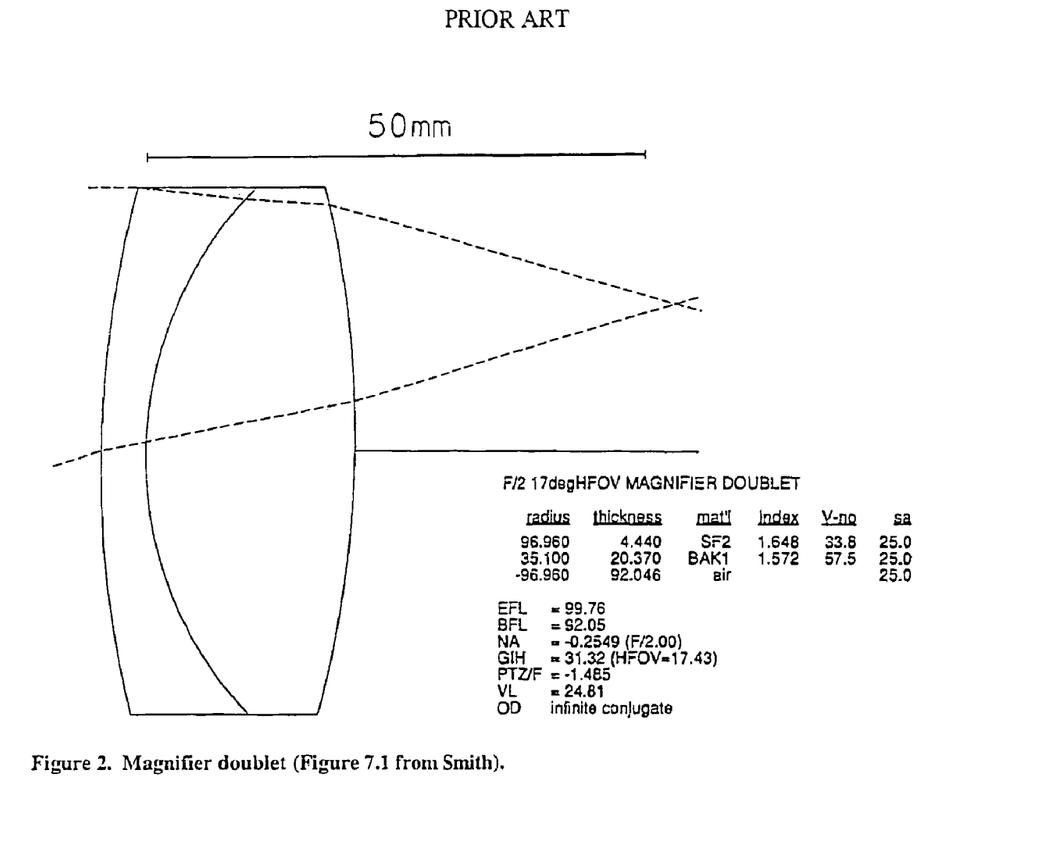
FIG. 2 is a schematic view of a prior art magnifier doublet.
Figure 3:
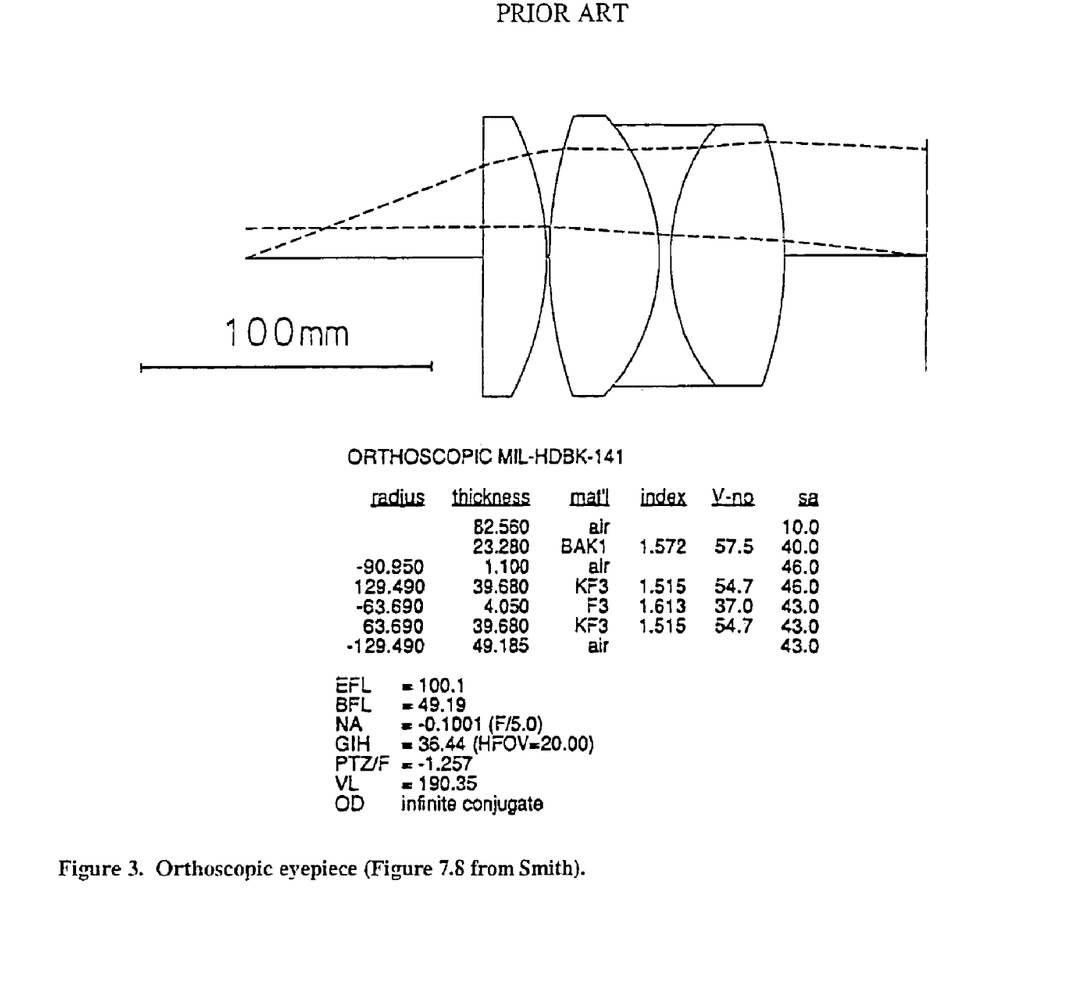
FIG. 3 is a schematic view of a prior art orthoscopic eyepiece.
Figure 4:
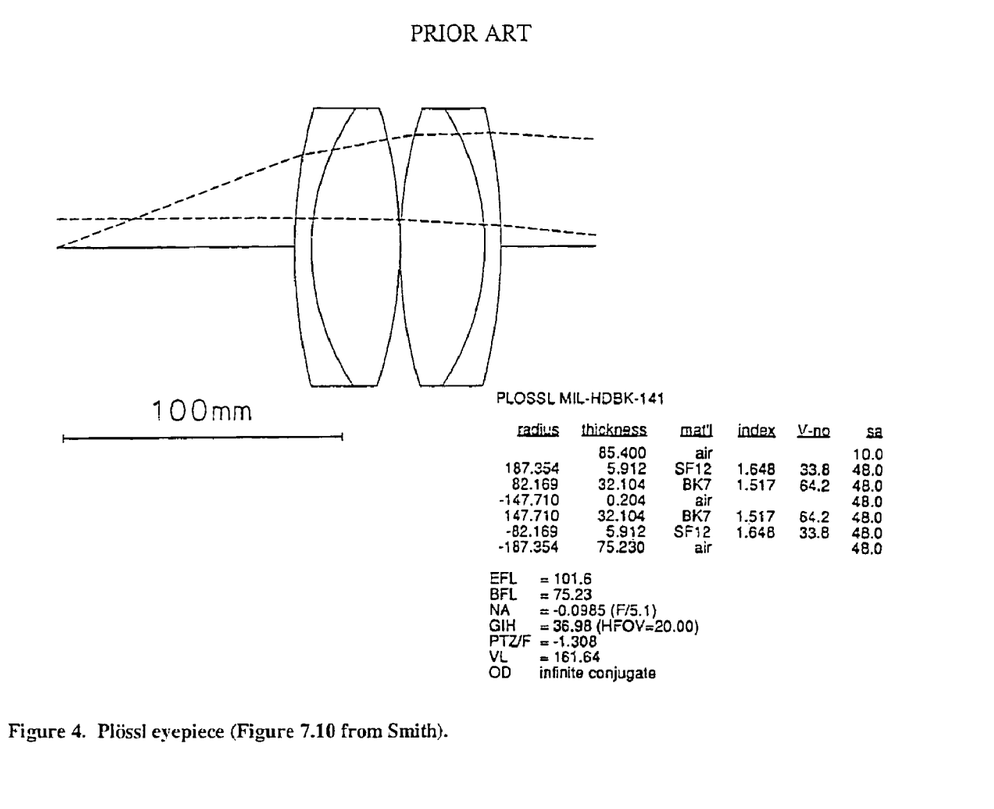
FIG. 4 is a schematic view of a prior art Plössl eyepiece.
Figure 5:
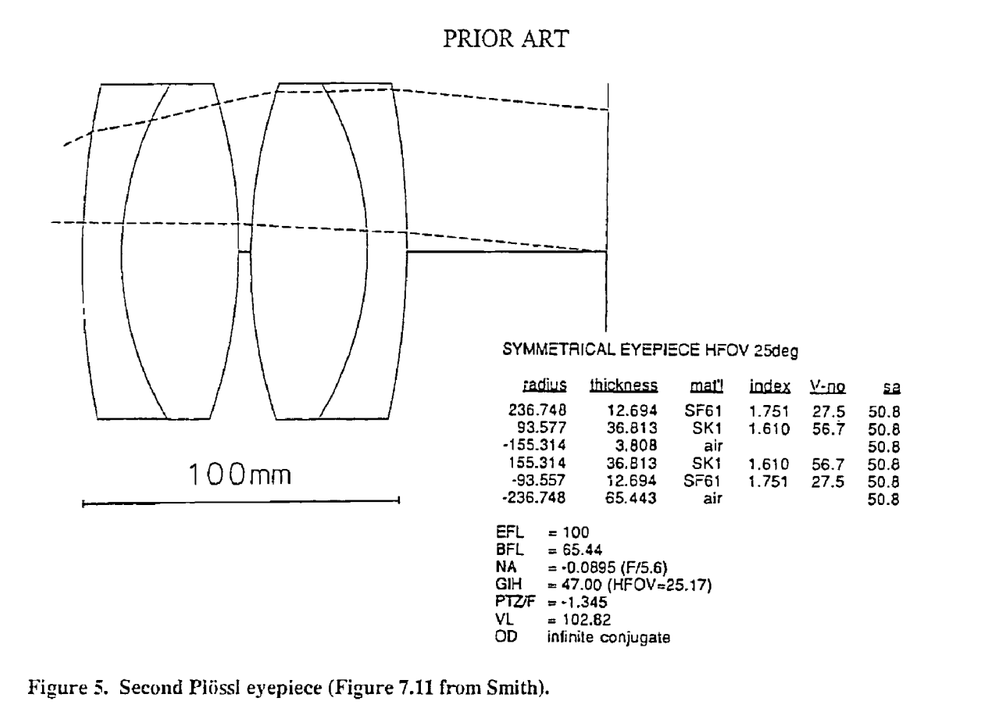
FIG. 5 is a schematic view of another prior art Plössl eyepiece.

To miniaturize electronic cameras, it is desirable to make EVFs with small heights. It is instructive to review the performance of magnifiers known in the art. For example, in his book *Modern Lens Design: a Resource Manual* (McGraw-Hill, New York, 1992), Warren J. Smith describes designs of a number of representative forms of magnifiers and eyepieces. He states, "Unlike an eyepiece, a good magnifier must be insensitive to the position of the eye, because in a magnifier there is no exit-pupil-image of the objective lens to define the location of the user's eye. This requires a better level of correction, especially for spherical aberration in the magnifier, so that the image doesn't swim or distort as the eye is moved about." These requirements specific to magnifiers apply in the present EVF case. After describing with reference to his FIG. 7.1 a design doublet specifically intended to be used as a magnifier, Smith goes on to say, "The symmetrical eyepiece (FIGS. 7.10 through 7.14) and the orthoscopic eyepiece (FIG. 7.8) also work well as magnifiers." We reproduce here Smith's designs for the doublet magnifier (FIG. 2), the orthoscopic eyepiece (FIG. 3), and the symmetrical eyepiece (FIG. 4 and FIG. 5). Table 1 below compares the relevant features of these different designs (in the cases where Smith includes a stop outside the lens as part of the vertex length, we have removed it to make the numbers in the table consistent with the above definition of vertex length). To simplify the comparisons, we have assumed the virtual image is at infinity, i.e. that the display pixel plane is at the eyepiece focal point.

TABLE 1

Heights of standard magnifier designs.

| DESIGN | PRESENT FIG. | SMITH FIG. | BFL/EFL | VL/EFL | H/EFL |
|---|---|---|---|---|---|
| thin lens | 1 | | 1.00 | 0.00 | 1.00 |
| magnifier doublet | 2 | 7.1 | 0.92 | 0.25 | 1.17 |
| orthoscopic | 3 | 7.8 | 0.49 | 1.08 | 1.57 |
| Plössl | 4 | 7.10 | 0.74 | 0.75 | 1.49 |
| Plössl | 5 | 7.11 | 0.65 | 1.02 | 1.67 |

As can be seen from the table, the height H is always larger than the EFL, and increases as the degree of correction improves, being generally around 1.5 times the EFL for well-corrected designs with modest fields of view.

EVFs utilize magnifications not much more than 20×, and more typically magnifications in the range of 10–16×. The use of magnifiers of the designs tabulated above would then result in minimum achievable heights of 14.6 mm (for a 20× magnifier of the simple doublet form) to 23.3 mm (for a more typical 16× magnifier with a better-corrected Plössl magnifier). However, it is desired to make cameras more miniature than allowed by these heights. Needed are magnifiers having a height H less than their EFL.

Figure 6:
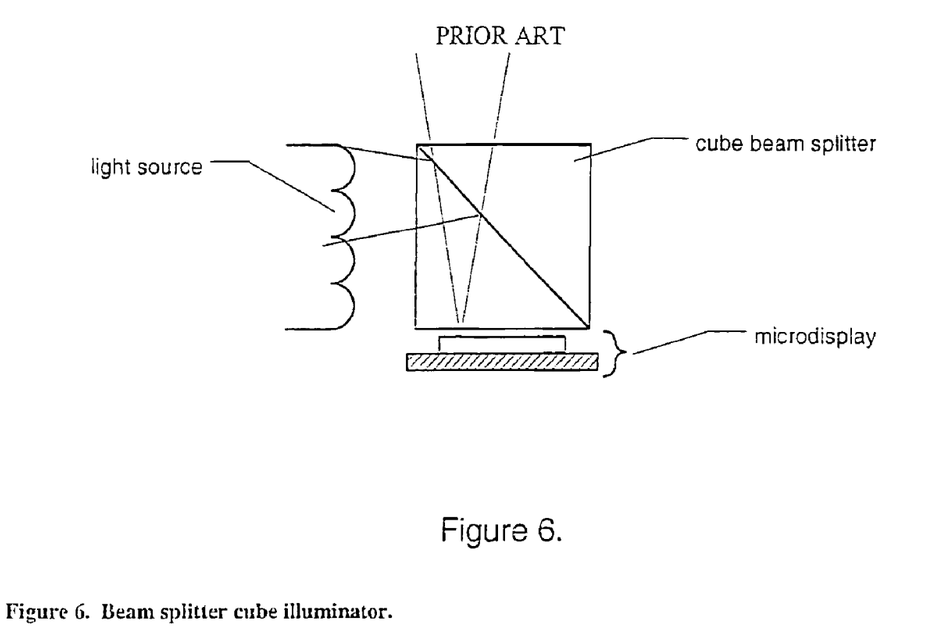
FIG. 6 is a schematic view of a prior art electronic viewfinder including illuminating a microdisplay via a cube beam splitter.

The design of compact electronic viewfinders is complicated in many cases by their use of reflective displays, which require provision for illumination from the front. This is typically accomplished as shown in FIG. 6 with a beam splitter cube. The requirement that the eye be able to see the display with minimal variation over a range of positions in turn requires that light from each point on the display fill a cone of angles. This means that the light source must be an extended diffuse source (that in the case of color displays should also be white over its whole extent), and that the illuminator cube beam splitter has to be substantially larger in its height than the lateral extent of the display's pixel array.

Frequently, the design of the EVF viewing optic is severely constrained by the long BFL needed to accommodate the illuminator cube and light source.

Thus, there is a need for EVF designs that combine improved magnifiers having a height less than their EFL with compatible illuminators for reflective displays. It is against this background and with a desire to improve on the prior art that the present invention has been developed.

SUMMARY

A miniature display system is provided that includes a microdisplay; a source of light positioned to direct light onto the microdisplay; and one or more optical elements positioned in front of the microdisplay to provide a magnified virtual image of the microdisplay for a viewer. The optical elements are all located within 10 millimeters of the microdisplay.

The microdisplay may be a reflective microdisplay. The source of light may supply diffuse light. The system may further include a polarizing beam splitter and the source of light may provide polarized light. The one or more optical elements may include one or more reflective surfaces. The one or more optical elements may include a quarter-wave plate. The one or more reflective surfaces may include a planar mirror. The one or more reflective surfaces may include a Mangin mirror. The one or more reflective surfaces may include a partially reflective surface of a meniscus lens.

The invention is also directed to a miniature display system that includes a microdisplay; a source of light positioned to direct light onto the microdisplay; and one or more optical elements positioned in front of the microdisplay to provide a magnified virtual image of the microdisplay for a viewer. The optical elements have an effective focal length that is greater than the distance of the optical elements from the microdisplay.

The invention is also directed to a miniature display system that includes a microdisplay; a source of polarized light positioned to direct light onto the microdisplay; a polarizing beam splitter positioned to receive light reflected from the microdisplay; a mirror positioned to receive light from the beam splitter and redirect light into the beamsplitter; and a magnifying lens positioned to receive light from the beamsplitter. Two of the three of the microdisplay, the mirror, and the magnifying lens are positioned on the same axis and the other of the three is positioned orthogonally thereto.

Numerous additional features and advantages of the present invention will become apparent to those skilled in the art upon consideration of the further description that follows.

DETAILED DESCRIPTION

Reference will now be made to the accompanying drawings, which assist in illustrating the various pertinent features of the present invention. Although the present invention will now be described primarily in conjunction with electronic viewfinders using microdisplays, it should be expressly understood that the present invention may be applicable to other applications where a compact optical arrangement is required/desired. In this regard, the following description of an electronic viewfinder is presented for purposes of illustration and description. Furthermore, the description is not intended to limit the invention to the form disclosed herein. Consequently, variations and modifications commensurate with the following teachings, and skill and knowledge of the relevant art, are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

Typically, the focal length of the lens system through which the user views the microdisplay is so large as to require a certain undesirably large distance between the lens system and the microdisplay. Furthermore, it has become conventional to place a beam splitter in the space between the lens system and the reflective microdisplay. In order to address these issues, several embodiments have been developed that should result in an electronic viewfinder system that is reduced in size.

Figure 7:
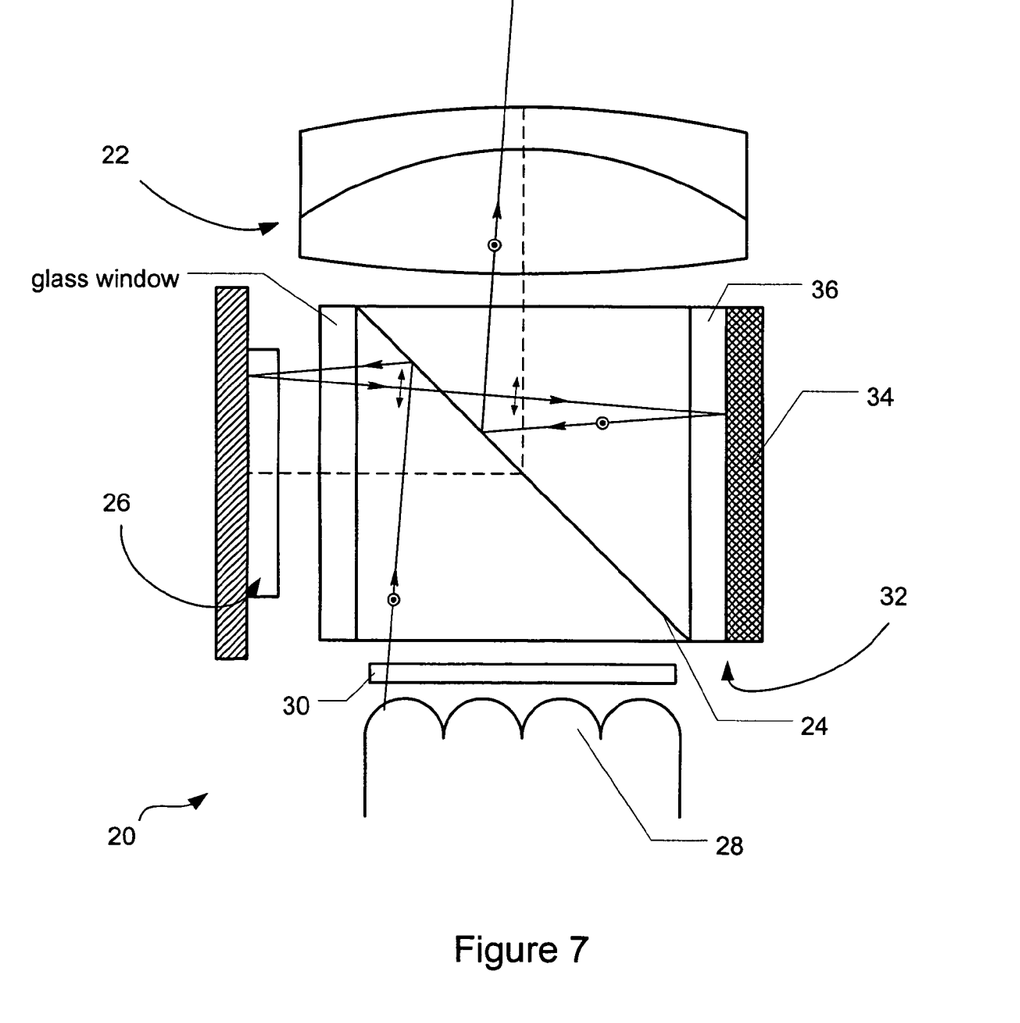
FIG. 7 is a schematic view of an electronic viewfinder having a once-folded refractive magnifier.

FIG. 7 shows a first embodiment of an electronic viewfinder 20 of the present invention. It uses an achromatic doublet magnifier 22 very similar to that described with reference to FIG. 2. However, through the use of a polarizing beam splitter (PBS) 24, the optical path between the magnifier lens 22 and a microdisplay 26 is folded, reducing the effective height of the viewfinder. A diffuse extended light source 28 provides light that is polarized by a polarizer 30 before it is directed to the PBS 24. Light having (s) polarization thus enters the PBS cube 24 from the light source 28 on the bottom, and, after striking the beam-splitter face, is reflected onto the microdisplay 26. ON pixels on the microdisplay reflect the incident light, rotating its polarization to <p> so that it is transmitted across the beam splitter 24 to a stack 32 including a mirror 34 plus a quarter-wave plate (QWP) 36 on the cube face opposite the microdisplay 26. This stack 32 again rotates the light's polarization, back to <s>, and reflects it back toward the PBS.24, where it is reflected toward the magnifier lens 22. The height, defined as the length of the dashed line in FIG. 7, is significantly reduced compared to the unfolded form of FIG. 2.

Figure 8:
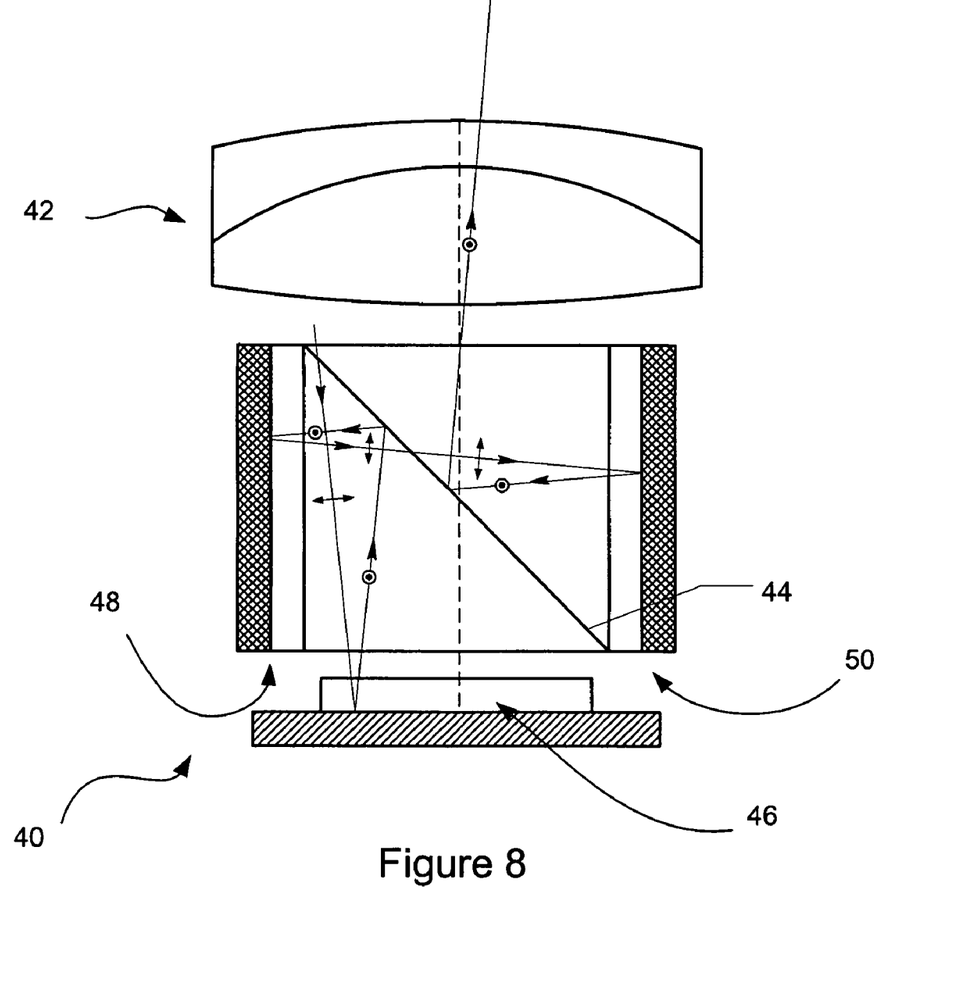
FIG. 8 is a schematic view of an electronic viewfinder having a twice-folded refractive magnifier.

FIG. 8 shows a second embodiment of an electronic viewfinder 40 of the present invention. It is similar to the embodiment of FIG. 7 in using a magnifier 42 of the achromatic doublet form. It accomplishes even greater reduction of height, though, through an even greater degree of folding of the optical path. The illuminator (not shown) now sits in the aperture of the magnifying lens 42, and emits <p>-polarized light through a PBS 44 towards a microdisplay 46. Again, ON pixels on the microdisplay 46 reflect the incident illumination, rotating its polarization to <s>. This <s>-polarized light is reflected by PBS 44 towards a first mirror-plus-QWP stack 48, where its polarization is rotated to <p> and it is reflected towards a second mirror-plus-QWP stack 50, located on the opposite side of the cube. The light's polarization is again rotated (now back to <s>>, and the light is reflected towards the PBS 44, which in turn reflects it upwards to the magnifier 42. In the embodiment described with respect to FIG. 7, the optical path length between the display and the lens was approximately twice the edge-length of the cube; in the FIG. 8 embodiment, it is three times the edge-length of the cube.

Figure 11:
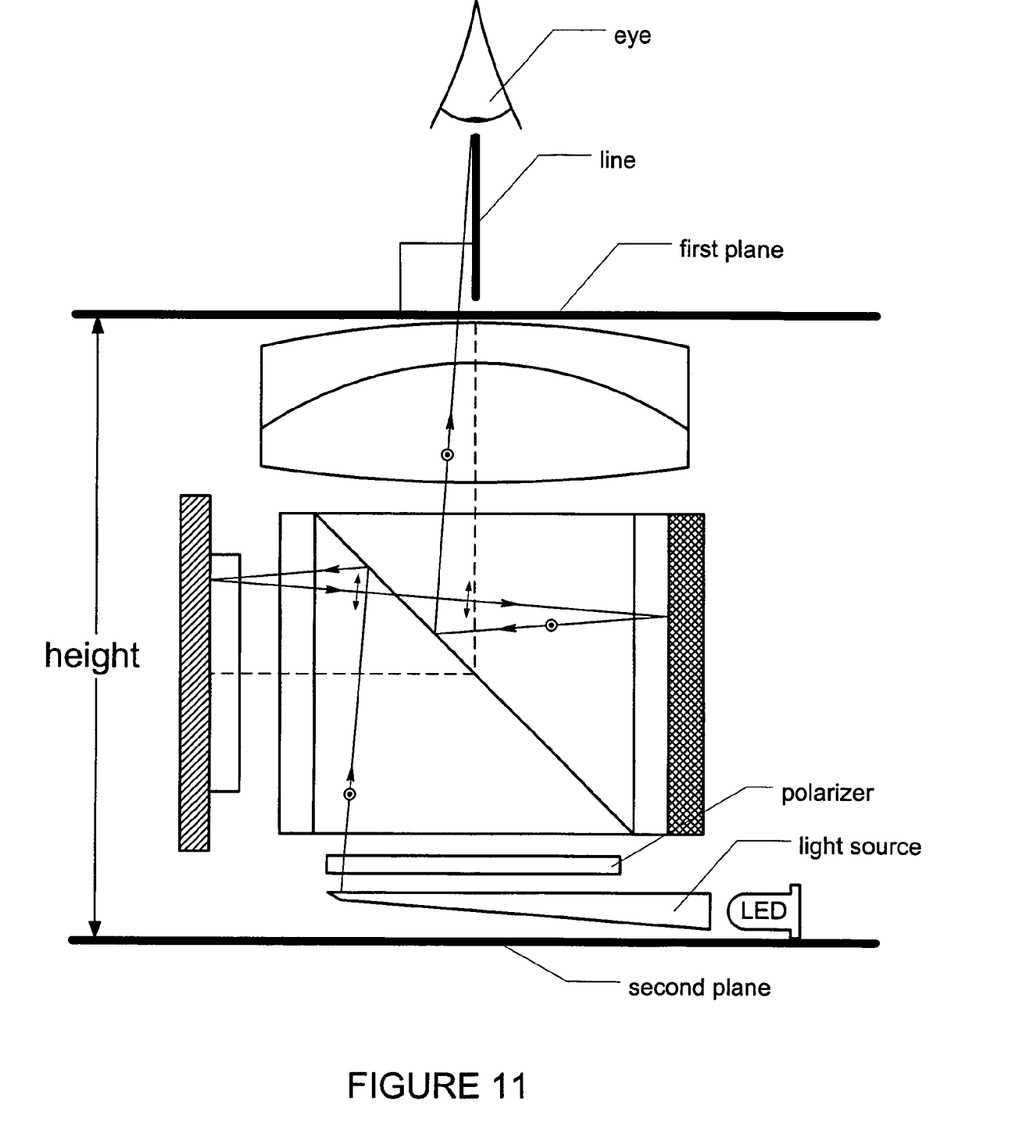
FIG. 11 is a schematic view of an electronic viewfinder having an alternative illumination scheme, showing a pair of planes defining the height of the viewfinder.
Figure 12:
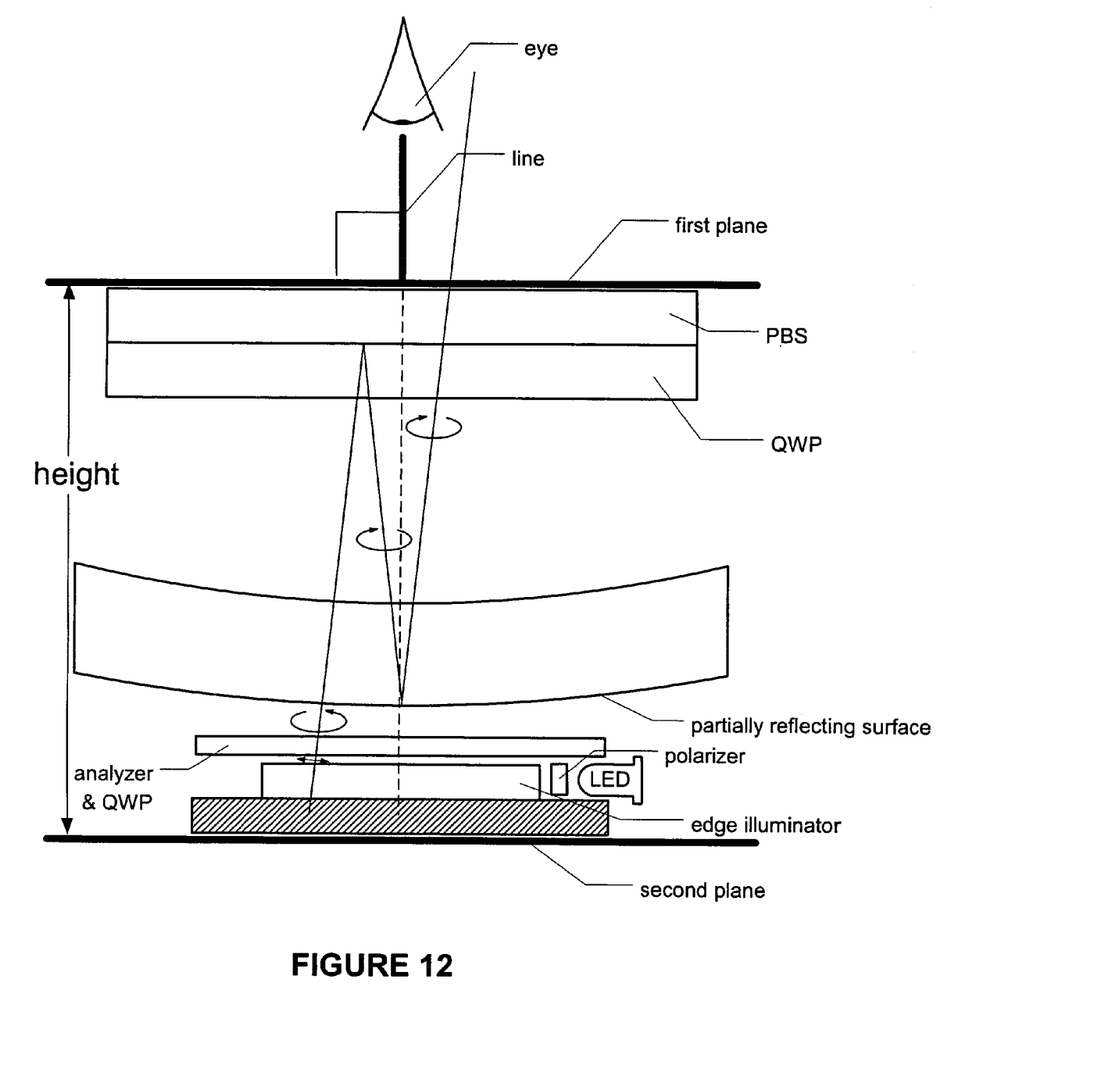
FIG. 12 is a schematic view of an electronic viewfinder having an alternative illumination scheme, showing a pair of planes defining the height of the viewfinder.

As stated above, the illumination for the embodiment shown in FIG. 8 originates in the aperture of the magnifying lens 42. A suitable illuminator could be provided in the form of an edge-lit total-internal-reflecting wedge of the type commonly used to backlight liquid-crystal display panels. When used as backlights, these transparent wedges usually have surface texture everywhere on their emitting face. Here, though, such texture would obscure the desired image. Instead, the wedge should have a few small bumps or dimples fashioned on its face, which should otherwise be smooth and polished. Each bump or dimple will redirect light propagating within the wedge into a cone of rays directed towards the display. Covering each bump or dimple with a small piece of polarizer oriented to pass <p> polarization may reduce stray light. Alternately, the illuminator could be provided in the aperture of lens 42 as an edge-lit total-internally-reflecting wedge (as shown in FIG. 11), with a holographic structure to couple light out of the wedge and direct it towards the microdisplay. The features of the holographic element are fine enough that they do not obscure or degrade the desired image. In yet another alternate form, the illuminator could be provided as an edge-illuminated holographic structure within the window of microdisplay 46 (as shown in FIG. 12).

Figure 9:
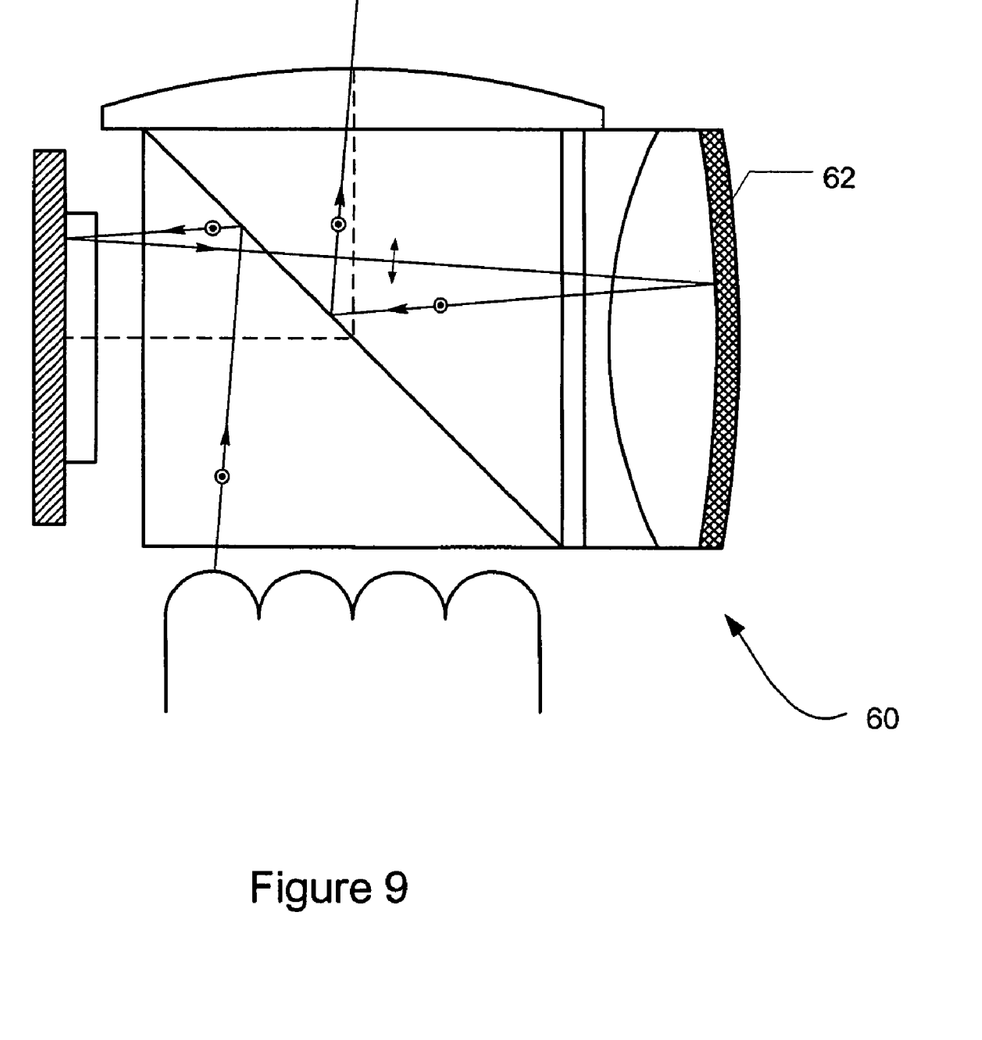
FIG. 9 is a schematic view of an electronic viewfinder having a cube eyepiece.

A third embodiment of an electronic viewfinder 60 of the invention is shown in FIG. 9. This embodiment is similar to the embodiment described with reference to FIG. 7, except the flat mirror 34 of FIG. 7 has been replaced by a Mangin mirror 62. The curved Mangin mirror 62 augments the magnifying power of a magnifying lens 64. Using a mirror to provide magnification has some advantages over using a lens: the mirror introduces no chromatic aberration, it introduces less spherical aberration, and it introduces field curvature with a sign opposite to the curvature introduced by a lens.

Figure 10:
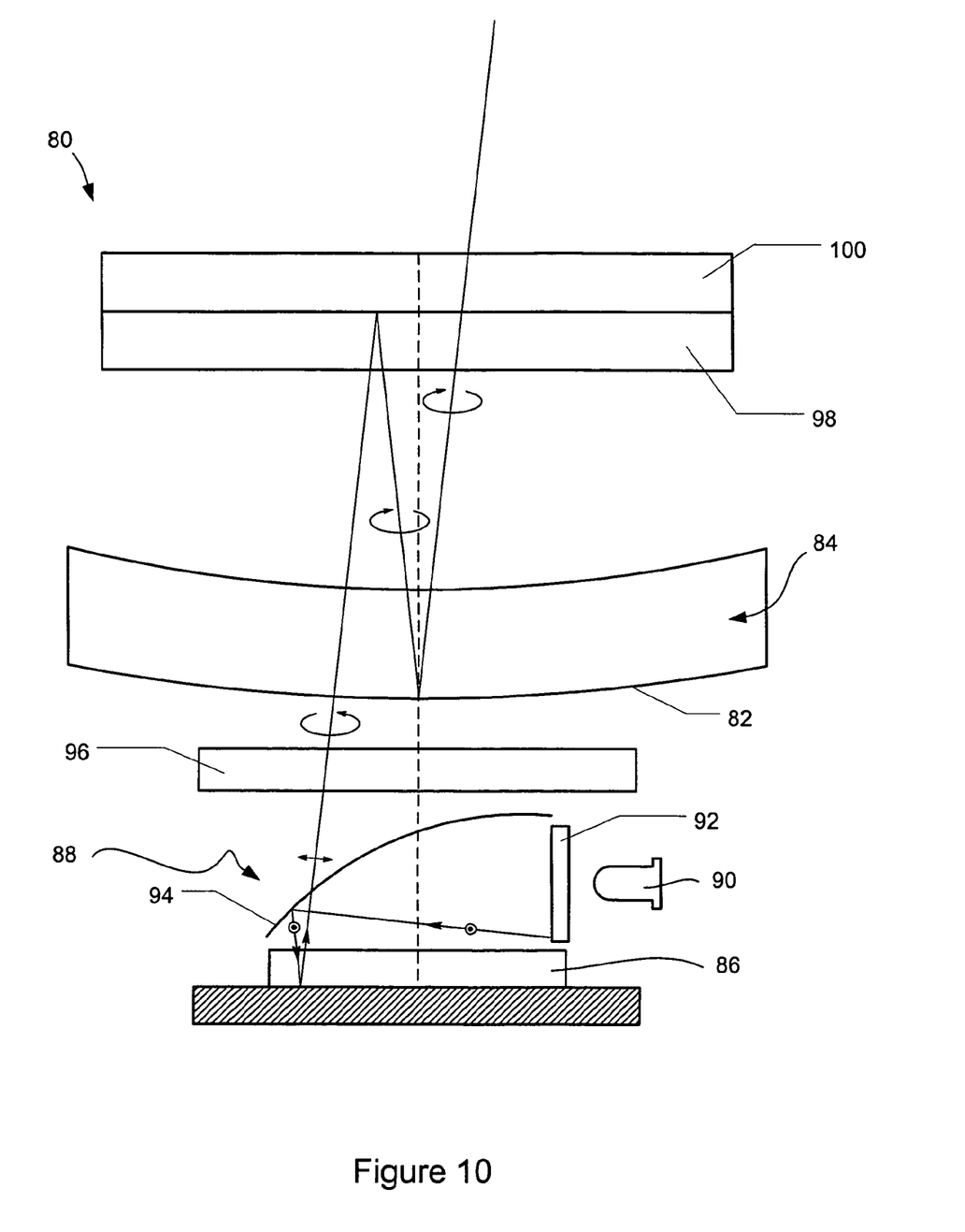
FIG. 10 is a schematic view of an electronic viewfinder having a pancake-window eyepiece.

A fourth embodiment of an electronic viewfinder 80 of the invention is shown in FIG. 10. This embodiment relies principally on the partially reflective surface 82 of a meniscus lens 84 for its magnification. A microdisplay 86 is illuminated by a low-profile curved PBS arrangement 88 like that used by Displaytech on its commercial EVF products, and it includes a light source 90, a polarizer/diffuser 92, and a curved PBS 94. Light source 90 might comprise red, green, and blue light-emitting diodes (LEDs) enabling, for example, color-sequential operation of display 86. In this case, the LEDs are spaced away from diffuser 92 such that diffuser 92 has across its extent an appearance that is substantially white and uniform (in time average) in color. The diffuser emits light everywhere across its extent into a range of angles, which might be Lambertian or quasi-Lambertian in character. The illuminator PBS 88 might be made from a material such as 3M's DBEF, an inexpensive polymer film that is easily bent as well as having excellent polarizing properties. Incident <s>-polarized light from the illuminator PBS 88 is reflected with its polarization rotated to <p> by ON pixels of the microdisplay 86. This light passes through a first QWP 96 (located between the PBS 88 and the meniscus lens 84), where its polarization is changed to a first circular polarization. At least part of this light passes through the partially reflecting surface 82 of the meniscus lens 84, and passes through a second QWP 98 (located above the meniscue lens 84) to a flat PBS 100. The flat PBS 100 might be made from a wire-grid polarizer like those sold by Moxtek, or might alternatively be made from a flat piece of DBEF film. The function of the second QWP 98 is to convert the circularly polarized light to linear polarization, which is substantially entirely reflected by the flat PBS 100. On the second pass through the second QWP 98, the light is again converted to circular polarization, which is at least partially reflected by the partially reflecting surface 82 of the meniscus 84. This reflection at the meniscus surface changes the handedness of the circular polarization, so that after passing through the second QWP 98 a third time, it is converted to the opposite linear polarization, and passes substantially entirely through the flat PBS 100 towards the eye. While the magnifying optic produces a virtual image of the display, it also acts in combination with the illuminator to produce a viewing box or region at any point within which the viewer's eye can be placed to see the illuminated virtual image of the display.

For a viewfinder presenting a virtual image of the display at an apparently infinite distance, the pixels of the display should be located one focal length away from the principal plane of the magnifier. In the embodiment of FIG. 10, the distance between the flat PBS 100 and the curved reflector 82 influences the height of the viewfinder. If the curved reflector surface is placed close to the flat PBS 100, making an optic with a short vertex length, then the microdisplay 86 should be placed a distance about equal to the EFL back from the curved reflector. As the spacing between the curved reflector 82 and the flat PBS 100 is increased, folding a greater length of the optical path between the elements, the proper position for the microdisplay 86 moves closer to the magnifier (meniscus lens 84), until, when the curved reflector 82 is approximately half the EFL from the flat PBS 100, the microdisplay 86 moves up to touch the reflector 82, and the overall height is minimized. Bringing the microdisplay 86 close to the reflector 82 requires reducing the height of the illuminator 88, as could be accomplished with the use of a holographic edge illuminator as taught in U.S. Pat. No. 5,808,800, or via other suitable methods.

The merits of the present invention can be ascertained by considering their heights. The height can be generalized for the folded embodiments of FIG. 7 and FIG. 9 where the microdisplay is angled relative to the furthest optical element according to the following construction. Find the point where a line normal to the display surface through its center intersects a line along the axis of the last optical element. Measure the (generalized) height H as the distance from the microdisplay to the intersection point plus the distance from the intersection point to the last optical surface. For all the embodiments the appropriate height is the length of the dashed line shown in the respective figures. As can be seen, in contrast to the prior-art magnifiers whose shortest height H was 1.17 times greater than its EFL, and that more typically had heights 1.5 or more times the EFL, the magnifiers of the present invention have heights that range down to be less than the EFL, and in the case of the embodiment of FIG. 10 as short at one-half the EFL when the curved reflector 82 is spaced apart from the flat PBS 100 by slightly less than one-half the EFL of the curved reflector 82 (of meniscus lens 84).

The merits of the present invention can alternatively be ascertained by considering the constructions of FIGS. 11 and 12. These figures show the construction of a first and second plane, as follows. The viewer's eye is placed in the center of the viewing region with its attention directed towards the center of the virtual image of the display. A line is drawn from the center of the eye along its gaze towards the viewfinder. A first plane is constructed perpendicular to this line, and placed as far away from the eye as is possible without touching any element of the viewfinder. A second plane is constructed parallel to the first plane, and placed on the opposite side of the viewfinder as close to the eye as possible without touching any element of the viewfinder. The distance between the planes defines a height. As can be seen, in contrast to the prior-art magnifiers where the height so defined was 1.17 times greater than the magnifier EFL, and that more typically had heights 1.5 or more times the EFL, the magnifiers of the present invention have heights that range down to be less than the EFL, and in the case of the embodiment of FIG. 10 as short at one-half the EFL when the curved reflector 82 is spaced apart from the flat PBS 100 by slightly less than one-half the EFL of the curved reflector 82 (of meniscus lens 84)

It is the case for many reflective displays that they perform best when the incident illumination makes an angle that is not too large with respect to the normal to the display's pixel plane. As described above, the illumination rays should preferably fill a cone; it is preferable that the axis of the cone make an angle not too large to the normal to the display's pixel plane, for example, an angle smaller than 20°. It is even more preferable for many reflective displays, such as liquid-crystal-on-silicon displays, that the illumination cone axis be perpendicular to the display's pixel plane (i.e. that the angle between the cone axis and the normal to the pixel plane be 0°).

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. Furthermore, each of the teachings of the inventions shown in the various embodiments could be combined with teachings from other embodiments. The embodiments described hereinabove are further intended to explain best modes known of practicing the invention and to enable others skilled in the art to utilize the invention in such, or other embodiments and with various modifications required by the particular application(s) or use(s) of the present invention.

The invention claimed is:

1. A miniature display system, comprising:
   a microdisplay;
   a source of light positioned to direct light onto the microdisplay; and
   one or more optical elements positioned in front of the microdisplay to provide a magnified virtual image of the microdisplay for a viewer;
   wherein the display system has a magnification and an overall height that satisfy the following relationship: the magnification of the system is less than 250 millimeters divided by the overall height of the system in millimeters.

2. A miniature display system as defined in claim 1 wherein the microdisplay is a reflective microdisplay.

3. A miniature display system as defined in claim 1 wherein the source of light supplies diffuse light.

4. A miniature display system as defined in claim 1 further including a polarizing beam splitter and wherein the source of light provides polarized light.

5. A miniature display system as defined in claim 1 wherein the one or more optical elements includes one or more reflective surfaces.

6. A miniature display system as defined in claim 5, wherein the one or more optical elements includes a quaffer-wave plate.

7. A miniature display system as defined in claim 5, wherein the one or more reflective surfaces includes a planar mirror.

8. A miniature display system as defined in claim 5, wherein the one or more reflective surfaces includes a Mangin mirror.

9. A miniature display system as defined in claim 5, wherein the one or more reflective surfaces includes a partially reflective surface of a meniscus lens.

10. A miniature display system, comprising:
    a microdisplay having a primary optical axis;
    a source of polarized light positioned to direct light onto the microdisplay;
    a polarizing beam splitter positioned to receive light reflected from the microdisplay;
    a mirror, having a primary optical axis, positioned to receive light from the beam splitter and redirect light into the beamsplitter; and
    a magnifying lens, having a primary optical axis, positioned to receive light from the beamsplitter;
    wherein the primary optical axes of two of the three of the microdisplay, the mirror, and the magnifying lens are coaxial and the primary optical axis of the other of the three is orthogonal to the primary optical axes of the first two.

11. A miniature display system as defined in claim 10, wherein the microdisplay is a reflective microdisplay.

12. A miniature display system as defined in claim 10, wherein the source of light supplies diffuse light.

13. A miniature display system as defined in claim 10, wherein the one or more optical elements includes one or more reflective surfaces.

14. A miniature display system as defined in claim 13, wherein the one or more optical elements includes a quaffer-wave plate.

15. A miniature display system as defined in claim 13, wherein the one or more reflective surfaces includes a planar mirror.

16. A miniature display system as defined in claim 13, wherein the one or more reflective surfaces includes a Mangin mirror.

17. A miniature display system as defined in claim 13, wherein the one or more reflective surfaces includes a partially reflective surface of a meniscus lens.

* * * * *

UNITED STATES PATENT AND TRADEMARK OFFICE
CERTIFICATE OF CORRECTION

PATENT NO. : 7,206,134 B2 Page 1 of 1
APPLICATION NO. : 11/051966
DATED : April 17, 2007
INVENTOR(S) : Weissman et al.

It is certified that error appears in the above-identified patent and that said Letters Patent is hereby corrected as shown below:

<u>Column 8</u>
Line 20 Claim 6, delete "quaffer-" and insert therefor -- quarter- --;
Line 55 Claim 14, delete "quaffer-" and insert therefor -- quarter- --.

Signed and Sealed this

Fifth Day of June, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,206,134 B2 | Page 1 of 1 |
| APPLICATION NO. | : 11/051966 | |
| DATED | : April 17, 2007 | |
| INVENTOR(S) | : Weissman et al. | |

It is certified that error appears in the above-identified patent and that said Letters Patent is hereby corrected as shown below:

Column 1, line 15, insert the following paragraph:

--STATEMENT REGARDING FEDERALLY-SPONSORED RESEARCH/DEVELOPMENT
This invention was made with Government support under contract NNJ04JC30C awarded by NASA. The Government has certain rights in the invention.--

Signed and Sealed this

Fourteenth Day of April, 2009

JOHN DOLL
*Acting Director of the United States Patent and Trademark Office*